(12) United States Patent
Ripley et al.

(10) Patent No.: US 10,033,277 B2
(45) Date of Patent: *Jul. 24, 2018

(54) CIRCUITS AND METHODS RELATED TO VOLTAGE CONVERTERS

(71) Applicant: SKYWORKS SOLUTIONS, INC., Woburn, MA (US)

(72) Inventors: David Steven Ripley, Marion, IA (US); Hui Liu, Cedar Rapids, IA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,003

(22) Filed: Oct. 17, 2016

(65) Prior Publication Data

US 2017/0133932 A1 May 11, 2017

Related U.S. Application Data

(63) Continuation of application No. 14/703,740, filed on May 4, 2015, now Pat. No. 9,473,019, which is a continuation of application No. 14/025,569, filed on Sep. 12, 2013, now Pat. No. 9,054,575, which is a continuation of application No. 12/956,010, filed on Nov. 30, 2010, now Pat. No. 8,537,579.

(60) Provisional application No. 61/265,454, filed on Dec. 1, 2009.

(51) Int. Cl.
*H02M 3/07* (2006.01)
*H02M 3/158* (2006.01)

(52) U.S. Cl.
CPC ................ *H02M 3/158* (2013.01)

(58) Field of Classification Search
CPC .......... H02M 3/06; H02M 3/07; H02M 3/073; H02M 2007/4835; H02M 3/18
USPC ....................... 363/59, 60, 62; 307/109, 110
See application file for complete search history.

(56) References Cited

U.S. PATENT DOCUMENTS

| 4,497,054 | A | 1/1985 | Read |
| 4,581,603 | A | 4/1986 | Ingold et al. |
| 4,719,447 | A | 1/1988 | Garuts |
| 4,983,865 | A | 1/1991 | Ho et al. |
| 5,227,781 | A | 7/1993 | Ninnis |
| 6,055,168 | A | 4/2000 | Kotowski et al. |

(Continued)

FOREIGN PATENT DOCUMENTS

| CN | 1474500 | 2/2004 |
| CN | 1909348 | 2/2007 |

(Continued)

OTHER PUBLICATIONS

ISR and WOSA dated Aug. 26, 2011 for International Application No. PCT/US2010/058274, filed on Nov. 30, 2010.

(Continued)

*Primary Examiner* — Adolf Berhane
(74) *Attorney, Agent, or Firm* — Chang & Hale LLP

(57) ABSTRACT

In a voltage converter, a mode configuration is selected in response to a mode control signal using a switch matrix having two or more mode configurations. Each mode configuration corresponds to one of two or more output signal voltages. The output signal is compared with a reference signal to produce a direction comparison signal. The direction comparison signal is used to produce the mode control signal.

14 Claims, 10 Drawing Sheets

(56) References Cited

U.S. PATENT DOCUMENTS

| | | | |
|---|---|---|---|
| 6,198,645 B1 | 3/2001 | Kotowski et al. | |
| 6,226,193 B1 * | 5/2001 | Bayer | H02M 3/07 363/59 |
| 6,373,340 B1 | 4/2002 | Shashoua | |
| 6,531,792 B2 | 3/2003 | Oshio | |
| 6,753,623 B2 | 6/2004 | McIntyre et al. | |
| 6,903,572 B2 | 6/2005 | Nozawa et al. | |
| 7,286,069 B1 | 10/2007 | Duewer et al. | |
| 7,342,389 B1 | 3/2008 | Wu et al. | |
| 8,040,162 B2 | 10/2011 | Miyazaki | |
| 8,537,579 B2 * | 9/2013 | Ripley | H02M 3/07 363/59 |
| 8,704,408 B2 | 4/2014 | Becker et al. | |
| 8,749,308 B2 | 6/2014 | Wilson | |
| 8,848,947 B2 | 9/2014 | Poulsen | |
| 9,054,575 B2 * | 6/2015 | Ripley | H02M 3/07 |
| 9,106,183 B2 | 8/2015 | Liu et al. | |
| 2001/0038279 A1 * | 11/2001 | Jaworski | H02M 3/07 323/288 |
| 2007/0052471 A1 | 3/2007 | Ng | |
| 2009/0072800 A1 | 3/2009 | Ramadass et al. | |
| 2009/0224743 A1 | 9/2009 | Bairanzade et al. | |
| 2010/0277225 A1 | 11/2010 | Gerber | |
| 2011/0128761 A1 | 6/2011 | Ripley et al. | |
| 2012/0170770 A1 | 7/2012 | Lesso et al. | |
| 2012/0293254 A1 | 11/2012 | Liu et al. | |
| 2012/0326901 A1 | 12/2012 | Zhao et al. | |

FOREIGN PATENT DOCUMENTS

| | | |
|---|---|---|
| CN | 101478234 | 7/2009 |
| JP | 2007-336722 | 12/2007 |

OTHER PUBLICATIONS

Mengzhe Ma, "Design of High Efficiency Step-Down Switched Capacitor DC/DC Converter," Oregon State University, Jun. 2004.

* cited by examiner

| V_23 | V12 | V_13 | V_UD | NEXT MODE | HOLD |
|---|---|---|---|---|---|
| 0 | 0 | 0 | 0 | N/A | 1 |
| 0 | 0 | 0 | 1 | 1/3 | 0 |
| 0 | 0 | 1 | 0 | 1/3 | 0 |
| 0 | 1 | 1 | 1 | 1/2A | 0 |
| 0 | 1 | 1 | 0 | 1/2B | 0 |
| 1 | 1 | 1 | 1 | 2/3 | 0 |
| | | | 0 | 2/3 | 0 |

FIG. 7

CIRCUITS AND METHODS RELATED TO VOLTAGE CONVERTERS

CROSS-REFERENCE TO RELATED APPLICATIONS

The benefit of the filing date of U.S. Provisional Patent Application Ser. No. 61/265,454, filed Dec. 1, 2009, entitled "Continuously Variable Switched Capacitor DC-DC Supply," is hereby claimed, and the specification thereof is incorporated herein in its entirety by this reference. This application is a continuation of U.S. patent application Ser. No. 14/703,740, filed May 4, 2015, titled "VARIABLE SWITCHED CAPACITOR DC-DC VOLTAGE CONVERTER," which is a continuation of U.S. patent application Ser. No. 14/025,569, filed Sep. 12, 2013, issued as U.S. Pat. No. 9,054,575 on Jun. 9, 2015, titled "VARIABLE SWITCHED CAPACITOR DC-DC VOLTAGE CONVERTER," which is a continuation of U.S. patent application Ser. No. 12/956,010, filed Nov. 30, 2010, issued as U.S. Pat. No. 8,537,579 on Sep. 17, 2013, titled "VOLTAGE CONVERSION METHOD IN A CONTINUOUSLY VARIABLE SWITCHED CAPACITOR DC-DC VOLTAGE CONVERTER, the entire technical disclosures of each of which are hereby incorporated by reference. U.S. patent application Ser. No. 12/955,989, filed Nov. 30, 2010, entitled "CONTINUOUSLY VARIABLE SWITCHED CAPACITOR DC-DC VOLTAGE CONVERTER," is related.

BACKGROUND

One type of device that converts one DC voltage level to another is commonly known as a DC-to-DC converter (or "DC-DC" converter). DC-DC converters are commonly included in battery-operated devices such as mobile telephones, laptop computers, etc., in which the various subsystems of the device require several discrete voltage levels. In some types of devices, such as a mobile telephone that operates in a number of different modes, it is especially desirable to supply certain elements, such as power amplifiers, with a supply voltage at the most efficient level for the mode of operation, rather than waste power and accordingly drain the battery prematurely. In such devices, it is desirable to employ a DC-DC converter that can generate a greater number of discrete voltage levels.

Several types of DC-DC converters are known, including switched-mode DC-DC converters and DC-DC converters that employ pulse-width modulation (PWM). Switched-mode DC-DC converters convert one DC voltage level to another by storing the input energy momentarily in inductors or capacitors and then releasing that energy to the output at a different voltage. The switching circuitry thus continuously switches between two states or phases: a first state in which a network of inductors or capacitors is charging, and a second state in which the network is discharging. The switching circuitry can be configured to generate an output voltage that is a fixed fraction of the battery voltage, such as one-third, one-half, two-thirds, etc., where a mode selection signal is provided as an input to the switching circuitry to control which of the fractions is to be employed. Different configurations of the network of inductors or capacitors can be selected by manipulating switches in the network using the mode selection signal.

The number of discrete output voltages that a switched-mode DC-DC converter can generate is related to the number of inductors or capacitors. In a portable, handheld device such as a mobile telephone it is desirable to minimize size and weight. A DC-DC converter having a large number of inductors or capacitors is not conducive to minimizing the size and weight of a mobile telephone. A PWM-based DC-DC converter can generate a larger number of discrete voltages than a switched-mode DC-DC converter without employing significantly more inductors, capacitors or other elements. However, a PWM-based DC-DC converter can generate a large spectrum of spurious output signals that can adversely affect the operation of a mobile telephone or other frequency-sensitive device. Filters having large capacitances or inductances can be included in a PWM-based DC-DC converter to minimize these spurious signals, but large filter capacitors or inductors are undesirable for the same reasons described above.

SUMMARY

Embodiments of the invention relate to a method of voltage conversion in a switching voltage converter that can produce an output signal of not only any of a number of discrete voltage levels but also of intermediate values between the discrete voltage levels, by switching between two or more selectable modes, each corresponding to one of the discrete voltage levels. A mode configuration is selected in response to a mode control signal using a switch matrix having a plurality of mode configurations. Each mode configuration corresponds to one of a plurality of output signal voltages. The output signal is compared with a reference signal to produce a direction comparison signal. The direction comparison signal is used to produce the mode control signal.

In an exemplary embodiment, the voltage converter is a switched-capacitor voltage converter having a two or more capacitors, a switch matrix, comparator logic, and control logic. A reference signal is input to the comparator logic, which also receives the output signal as feedback. In each mode, the switch matrix interconnects the capacitors in a different configuration. Each mode or mode configuration has two phase configurations: one in which the capacitor circuit is charged and another in which the capacitor circuit is discharged. The switch matrix switches between the two phase configurations of a selected mode configuration in response to a clock signal. As a result of this switching, the voltage converter produces an output signal having a voltage that corresponds to a selected mode configuration. By alternately switching between two of the modes, the voltage converter can produce an output voltage having a level that corresponds to the reference signal voltage in an instance in which the reference signal voltage lies between two of the discrete voltage levels corresponding to those modes.

In the exemplary embodiment, the comparator logic compares the output signal with the reference signal and produces a direction comparison signal indicating which of the output signal and the reference signal is greater in magnitude than the other. The comparison signal thus indicates whether the control logic is to cause the output signal voltage to increase or decrease to match the reference signal.

In the exemplary embodiment, the control logic uses one or more signals from the comparator logic, including the direction comparison signal, to select the mode. If the direction comparison signal indicates that the reference signal is greater than the output signal, the control logic can switch the mode to one that corresponds to an output signal voltage that is greater than the reference signal. Changing the mode in this manner causes the output signal voltage to increase. However, if the direction comparison signal indicates that the output signal is greater than the reference signal, the control logic can switch the mode to one that corresponds to an output signal voltage less than the reference signal. Changing the mode in this manner causes the output signal voltage to decrease.

Other systems, methods, features, and advantages of the invention will be or become apparent to one with skill in the art upon examination of the following figures and detailed description.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

FIG. 7 is a table illustrating combinational logic of the mode selection logic shown in FIG. 1.

DETAILED DESCRIPTION

Figure 1:
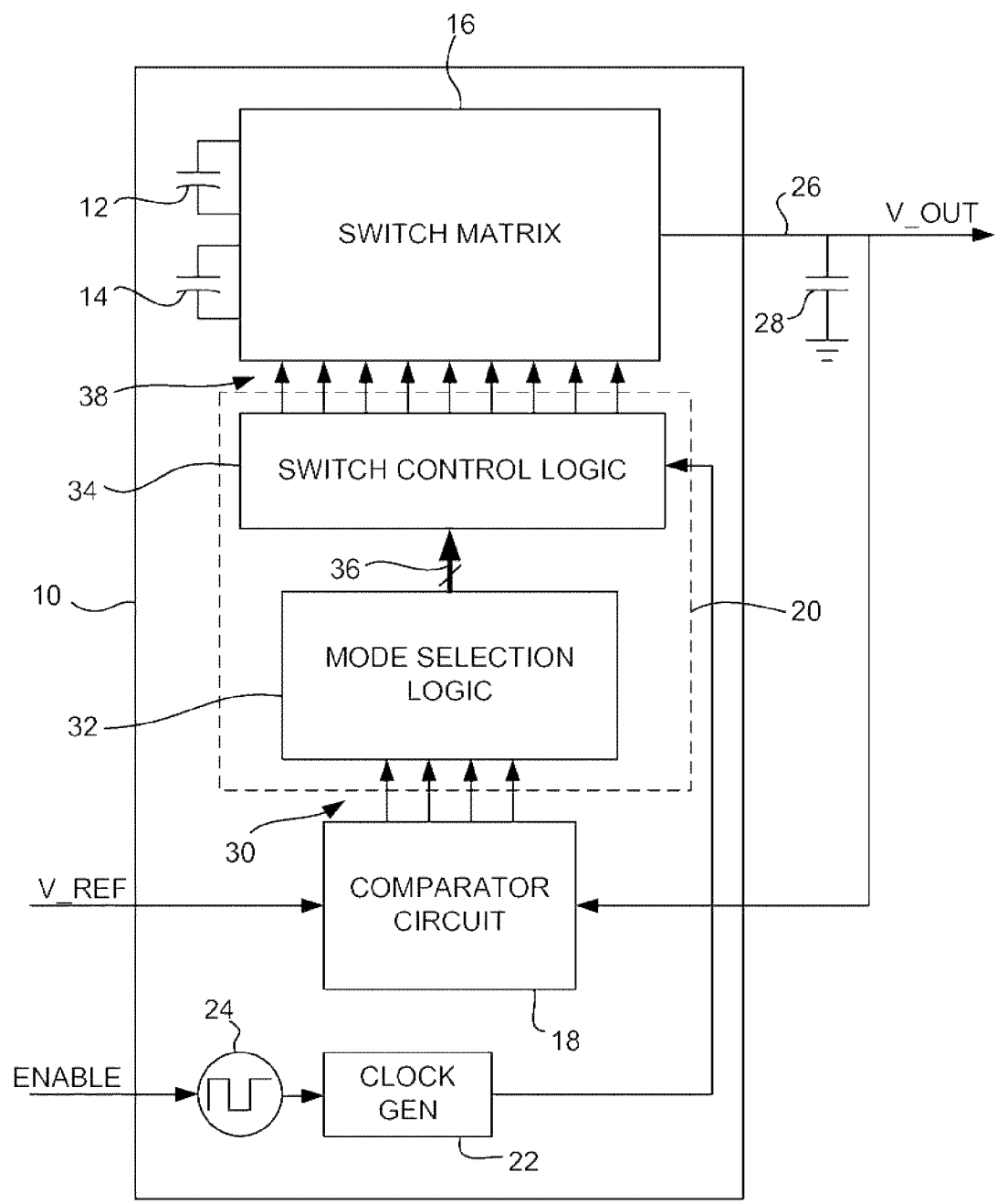
FIG. 1 is a block diagram of a voltage converter in accordance with an exemplary embodiment of the present invention.

As illustrated in FIG. 1, in an illustrative or exemplary embodiment of the invention, a voltage converter 10 includes two capacitors 12 and 14, a switch matrix 16, a comparator circuit 18, and control logic 20. A reference voltage signal (V_REF) is provided to voltage converter 10 as a control input. In the manner described below, voltage converter 10 produces an output voltage signal (V_OUT) that corresponds to or tracks the reference voltage signal. Voltage converter 10 further includes a clock signal generator circuit 22 and associated oscillator 24 that can be activated by an Enable signal. The Enable signal remains active during the operation described below.

Switch matrix 16 can assume one of several mode configurations, described below, in which capacitors 12 and 14 are interconnected in different configurations. In each mode configuration, switch matrix 16 can assume either a first phase configuration, in which the capacitor circuit defined by the interconnected capacitors 12 and 14 is charging, or a second phase configuration, in which the capacitor circuit defined by the interconnected capacitors 12 and 14 is discharging. Switch matrix 16 provides the output of the capacitor circuit at an output node 26. In operation, switch matrix 16 alternately switches between the first and second phase configurations in response to the clock signal. Filter circuitry, such as a capacitor 28, can be connected to output node 26 to filter the output voltage signal.

As described in further detail below, comparator circuit 18 compares the output voltage signal with the reference voltage signal and, in response, produces a number of comparison signals 30. Control logic 20 includes mode selection logic 32 and switch control logic 34. Mode selection logic 32 receives comparison signals 30 and, in response, produces mode selection signals 36. Switch control logic 34 receives mode selection signals 36 and, in response, produces switch control signals 38.

As illustrated in FIGS. 2A, 2B, 3A, 3B, 4A, 4B, 5A and 5B, switch matrix 16 can interconnect capacitors 12 and 14 in several different configurations between a voltage potential (i.e., either the battery voltage or ground) and output node 26. Switch matrix 16 includes nine switches 40, 42, 44, 46, 48, 50, 52, 54 and 56, which are controlled by the above-referenced switch control signals 38 (S1-S9). Although switches 40-56 are shown schematically in FIGS. 2-5 in the form of controllable, single-pole, single-throw (SPST) switches, they can comprise any suitable switching devices, such as field-effect transistors (FETs). For example, each of switches 40 and 50 can comprise a P-type FET (PFET), each of switches 46 and 56 can comprise an N-type FET (NFET), and each of switches 42, 44, 48, 52 and 54 can comprise a parallel combination of a PFET and an NFET. The control terminal (e.g., gate) of each FET can receive one of switch control signals 38 (S1-S9).

Although in the exemplary embodiment switch matrix 16 includes nine switches, which can be arranged as shown, in other embodiments a switch matrix can include any other number of switches arranged in any other suitable manner. Similarly, although the exemplary embodiment includes two capacitors 12 and 14, which switch matrix 16 can interconnect as described below, other embodiments can include more than two capacitors, and a switch matrix can interconnect them in any other suitable configurations.

Figure 2A:
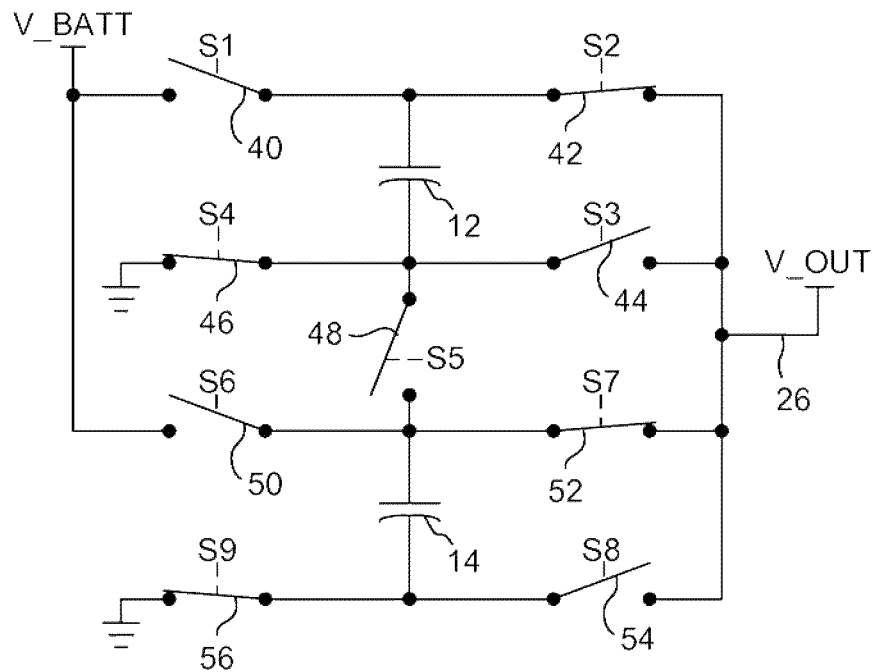
FIG. 2A is a circuit diagram illustrating the switch matrix shown in FIG. 1 in a first phase configuration of a first mode configuration.
Figure 2B:
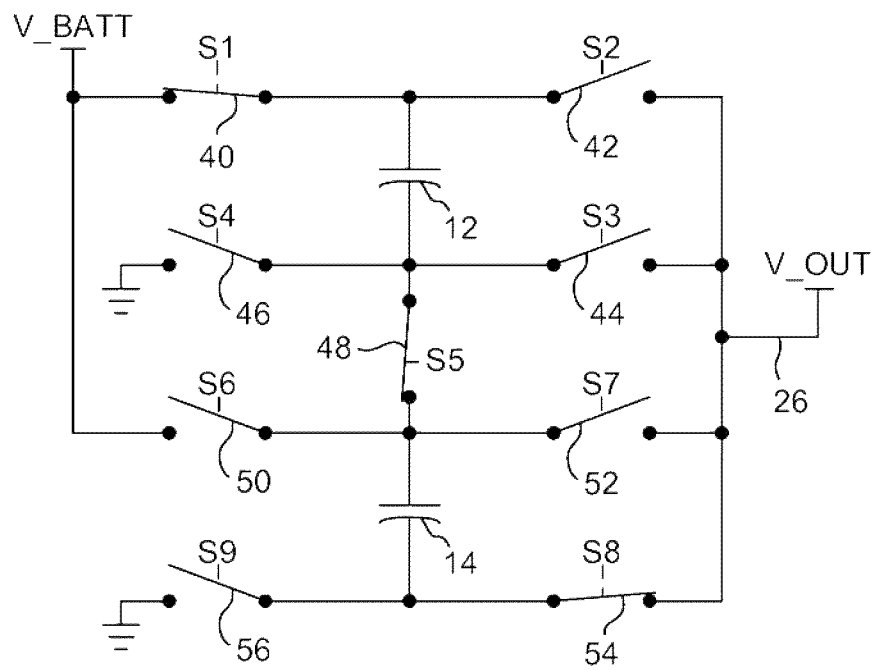
FIG. 2B is a circuit diagram similar to FIG. 2A, illustrating the switch matrix in a second phase configuration of the first mode configuration.

As illustrated in FIGS. 2A-B, in a first configuration, switch matrix 16 can interconnect capacitors 12 and 14 in either the first phase configuration shown in FIG. 2A or the second phase configuration shown in FIG. 2B. This first configuration can be referred to herein as the "⅓ mode" because operation in this mode is intended to result in an output voltage signal (V_OUT) at output node 26 having a voltage level that is nominally or on average about one-third of the battery voltage (V_BATT).

As shown in FIG. 2A, in the first phase configuration of the ⅓ mode, switches 40, 48, 44, 50 and 54 are open, and switches 42, 46, 52 and 56 are closed. The combination of the closed states of switches 42 and 46 couples capacitor 12 between a ground voltage potential (0 volts) and output node 26. The combination of the closed states of switches 52 and 56 similarly couples capacitor 14 between the ground potential and output node 26 (i.e., in parallel with capacitor 12). Thus, in the first phase configuration of the ⅓ mode, the capacitor circuit defined by capacitors 12 and 14 in parallel with each other discharges with respect to output node 26.

As shown in FIG. 2B, in the second phase configuration of the ⅓ mode, switches 42, 44, 46, 50, 52 and 56 are open, and switches 40, 48 and 54 are closed. The combination of the closed states of switches 40, 48 and 54 couples capacitors 12 and 14 in series between a positive voltage potential, such as a base reference voltage provided by a battery (V_BATT), and output node 26. Thus, in the second phase configuration of the ⅓ mode, the capacitor circuit defined by capacitors 12 and 14 in series with each other charges with respect to output node 26.

Figure 3A:
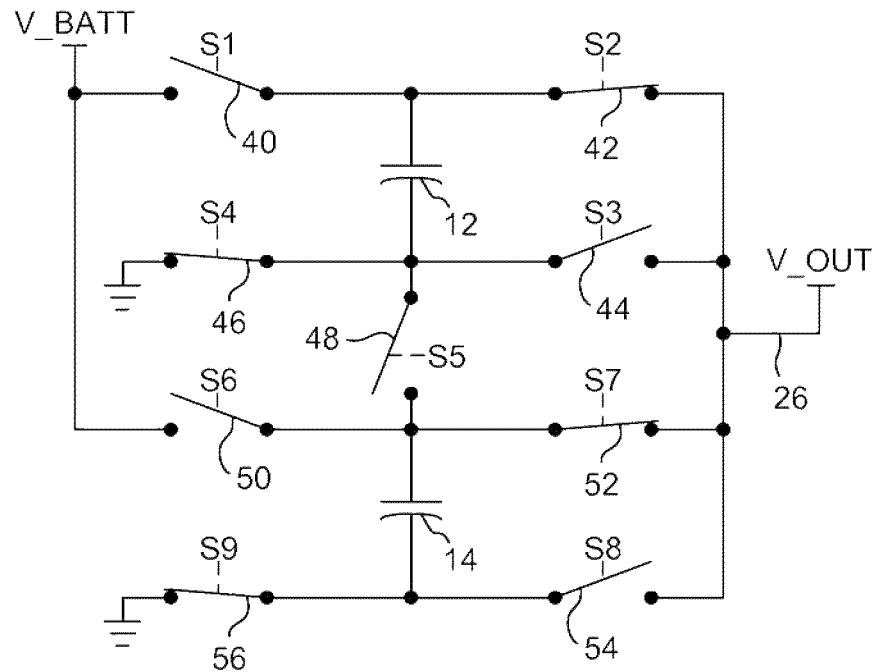
FIG. 3A is a circuit diagram illustrating the switch matrix shown in FIG. 1 in a first phase configuration of a second mode configuration.
Figure 3B:
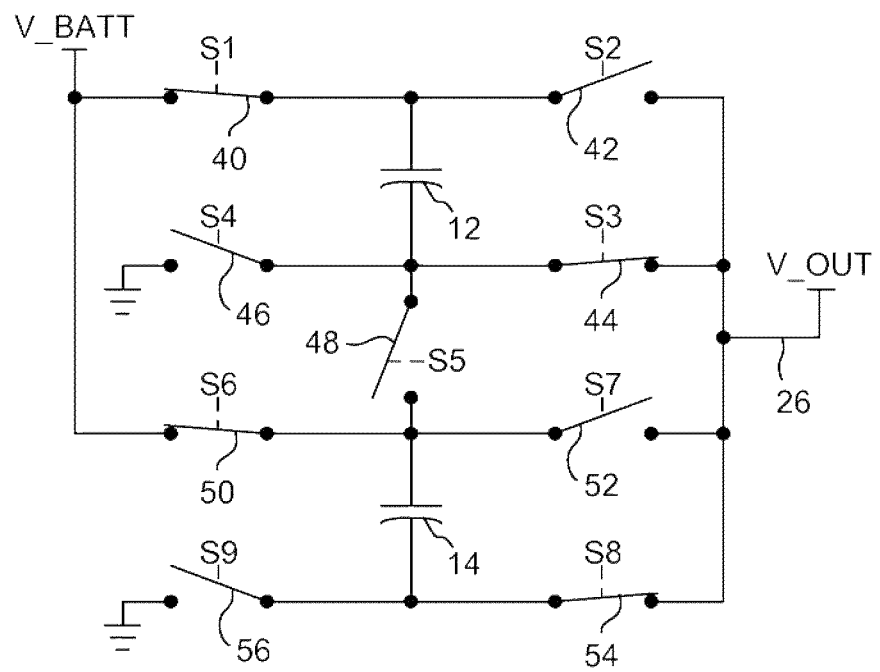
FIG. 3B is a circuit diagram similar to FIG. 2A, illustrating the switch matrix in a second phase configuration of the second mode configuration.

As illustrated in FIGS. 3A-B, in a second configuration, switch matrix 16 can interconnect capacitors 12 and 14 in either the first phase configuration shown in FIG. 3A or the second phase configuration shown in FIG. 3B. This second configuration can be referred to herein as the "½A mode" because operation in this mode is intended to result in an output voltage signal (V_OUT) at output node 26 having a voltage level that is nominally or on average about one-half of the battery voltage (V_BATT). Also, as described below, there is a variant of the ½A mode, referred to as the ½B mode.

As shown in FIG. 3A, in the first phase configuration of the ½A mode, switches 40, 44, 48, 50 and 54 are open, and switches 42, 46, 52 and 56 are closed. The combination of the closed states of switches 42 and 46 couples capacitor 12 between ground and output node 26. The combination of the closed states of switches 52 and 56 similarly couples capacitor 14 between ground and output node 26 (i.e., in parallel with capacitor 12). Thus, in the first phase configuration of the ½A mode, the capacitor circuit defined by capacitors 12 and 14 in parallel discharges with respect to output node 26.

As shown in FIG. 3B, in the second phase configuration of the ½A mode, switches 42, 46, 48, 52 and 56 are open, and switches 40, 44, 50 and 54 are closed. The combination of the closed states of switches 40 and 44 couples capacitor 12 between the battery voltage and output node 26. The combination of the closed states of switches 50 and 54 similarly couples capacitor 14 between the battery voltage and output node 26 (i.e., in parallel with capacitor 12). Thus, in the second phase configuration of the ½A mode, the capacitor circuit defined by capacitors 12 and 14 in parallel with each other charges with respect to output node 26.

Figure 4A:
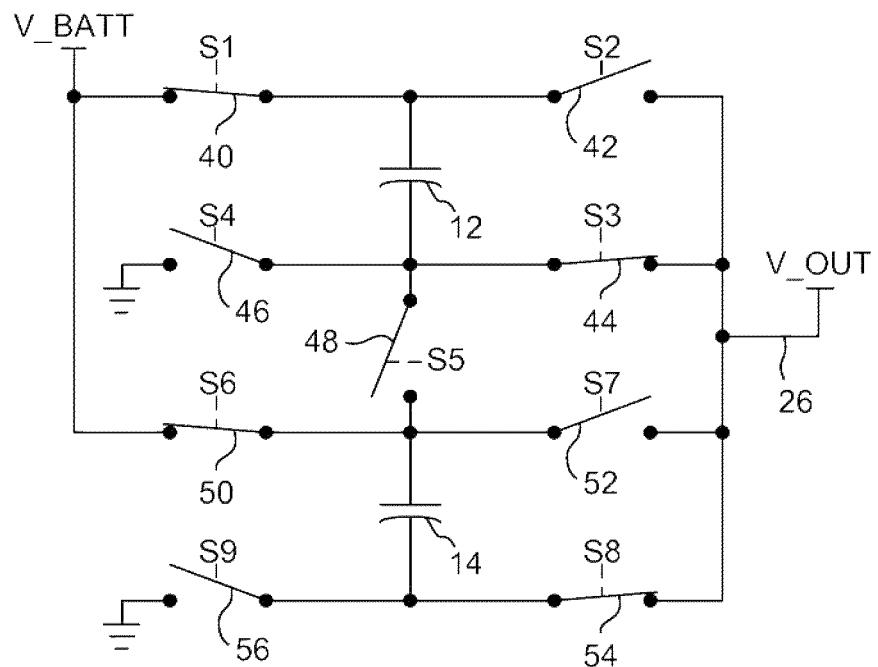
FIG. 4A is a circuit diagram illustrating the switch matrix shown in FIG. 1, illustrating the switch matrix in a first phase configuration of a variant of the second mode configuration.
Figure 4B:
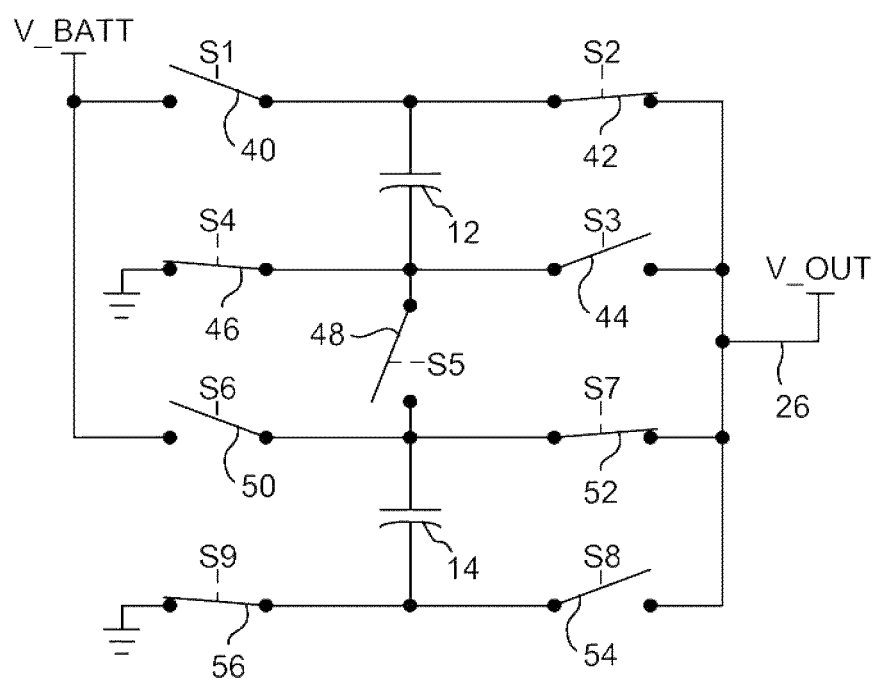
FIG. 4B is a circuit diagram similar to FIG. 3B, illustrating the switch matrix in a second phase configuration of the variant of the second mode configuration.

The ½B mode variant of the second mode configuration is shown in FIGS. 4A-B. The second mode configuration includes both the ½A and ½B modes or sub-modes to minimize the number of switches that change state during switching from one mode to another, as described below. Although these sub-modes are included in the exemplary embodiment, in other embodiments such sub-modes need not be included.

As shown in FIG. 4A, in the first phase configuration of the ½B mode, switches 42, 46, 48, 52 and 56 are open, and switches 40, 44, 50 and 54 are closed. The combination of the closed states of switches 40 and 44 couples capacitor 12 between the battery voltage and output node 26. The combination of the closed states of switches 50 and 54 similarly couples capacitor 14 between the battery voltage and output node 26 (i.e., in parallel with capacitor 12). Thus, in the second phase configuration of the ½B mode, the capacitor circuit defined by capacitors 12 and 14 in parallel charge with respect to output node 26.

As shown in FIG. 4B, in the second phase configuration of the ½B mode, switches 40, 44, 48, 50 and 54 are open, and switches 42, 46, 52 and 56 are closed. The combination of the closed states of switches 42 and 46 couples capacitor 12 between ground and output node 26. The combination of the closed states of switches 52 and 56 similarly couples capacitor 14 between ground and output node 26 (i.e., in parallel with capacitor 12). Thus, in the second phase configuration of the ½B mode, the capacitor circuit defined by capacitors 12 and 14 in parallel with each other discharges with respect to output node 26.

Figure 5A:
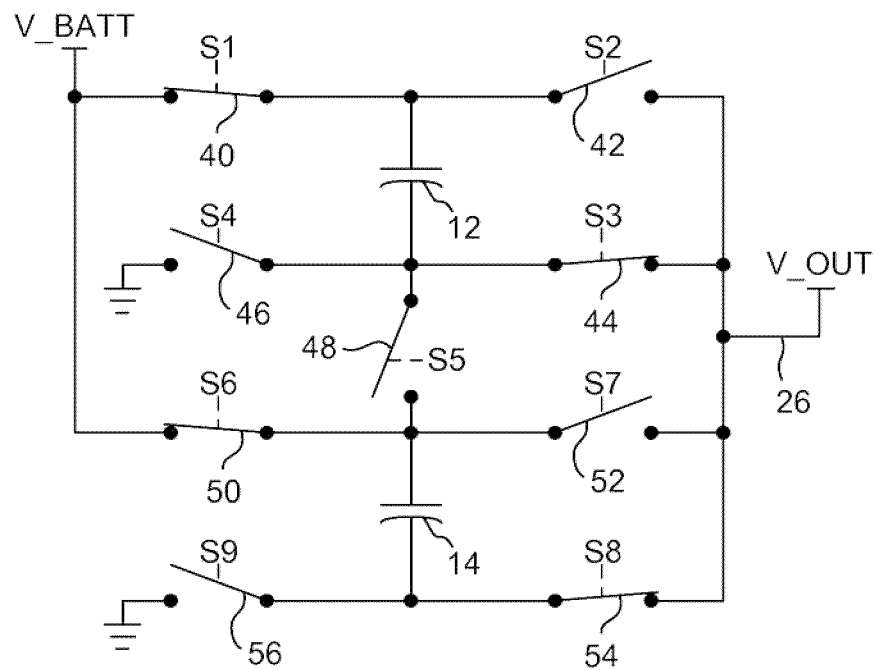
FIG. 5A is a circuit diagram illustrating the switch matrix shown in FIG. 1 in a first phase configuration of a third mode configuration.
Figure 5B:
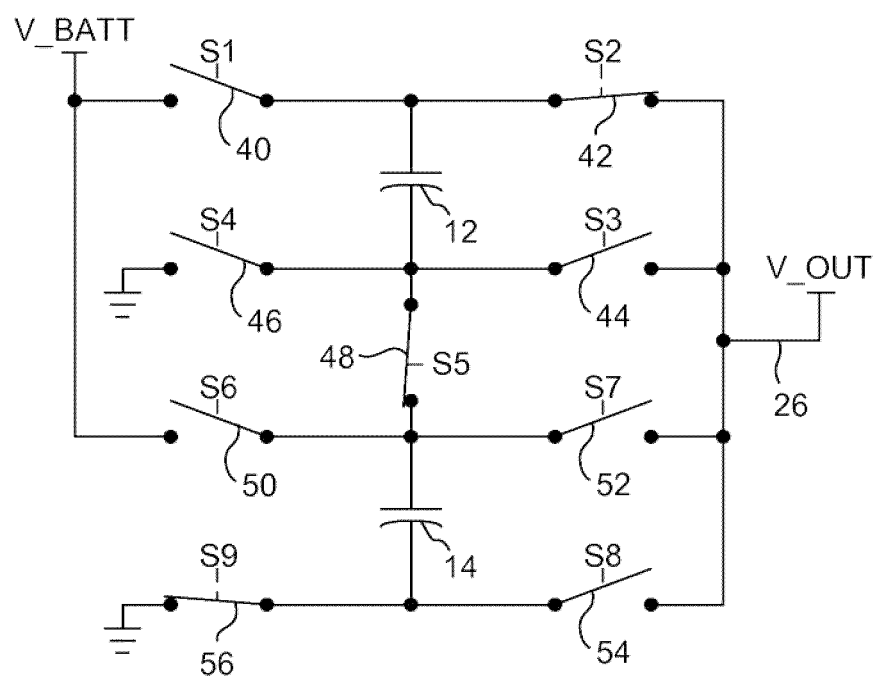
FIG. 5B is a circuit diagram similar to FIG. 2A, illustrating the switch matrix in a second phase configuration of the third mode configuration.

As illustrated in FIGS. 5A-B, in a third configuration, switch matrix 16 can interconnect capacitors 12 and 14 in either the first phase configuration shown in FIG. 5A or the second phase configuration shown in FIG. 5B. This third configuration can be referred to herein as the "⅔ mode" because operation in this mode is intended to result in an output voltage signal at output node 26 having a voltage level that is nominally about two-thirds of the battery voltage.

As shown in FIG. 5A, in the first phase configuration of the ⅔ mode, switches 42, 46, 48, 52 and 56 are open, and switches 40, 44, 50 and 54 are closed. The combination of the closed states of switches 40 and 44 couples capacitor 12 between the battery voltage and output node 26. The combination of the closed states of switches 50 and 54 similarly couples capacitor 14 between the battery voltage and output node 26 (i.e., in parallel with capacitor 12). Thus, in the first phase configuration of the ⅔ mode, the capacitor circuit defined by capacitors 12 and 14 in parallel with each other charges with respect to output node 26.

As shown in FIG. 5B, in the second phase configuration of the ⅔ mode, switches 40, 44, 46, 50, 52 and 54 are open, and switches 42, 48 and 56 are closed. The combination of the closed states of switches 42, 48 and 56 couples capacitors 12 and 14 in series between ground and output node 26. Thus, in the second phase configuration of the ⅔ mode, the capacitor circuit defined by capacitors 12 and 14 in series with each other discharges with respect to output node 26.

Figure 6:
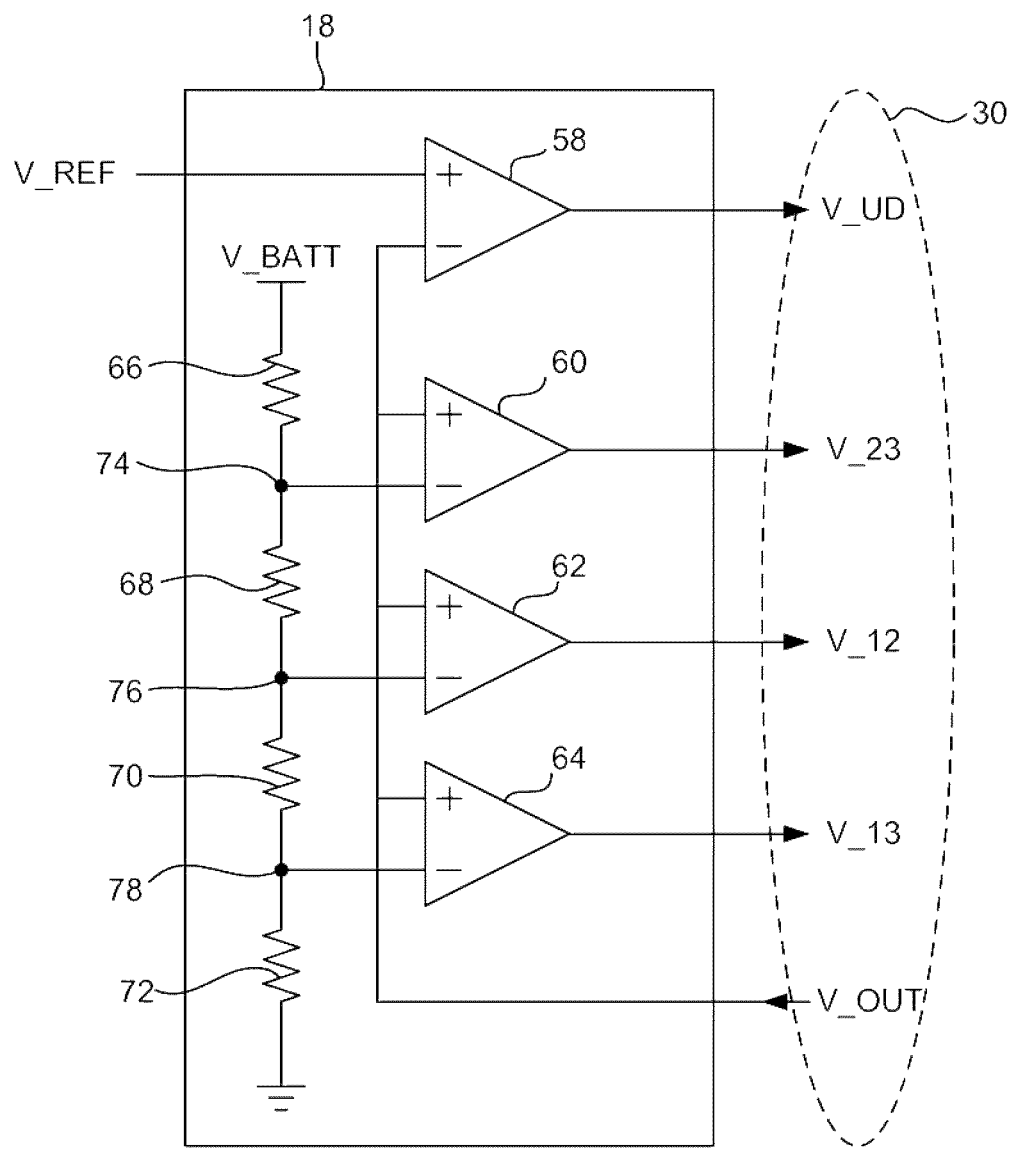
FIG. 6 is a circuit diagram of the comparator circuit shown in FIG. 1.

As illustrated in FIG. 6, comparator circuit 18 includes four comparators 58, 60, 62 and 64 and a voltage level generator comprising four resistors 66, 68, 70 and 72. Resistors 66-72 are connected in series with each other between the battery voltage and ground. The values of resistors 66-72 are selected so that the voltage at a node 74 at a first input of comparator 60 (e.g., the inverting input) is ⅔ (V_BATT), the voltage at a node 76 at a first input of comparator 62 is ½ (V_BATT), and the voltage at a node 78 at a first input of comparator 64 is ⅓ (V_BATT). The second input (e.g., the non-inverting input) of each of comparators 60, 62 and 64 is connected to the output voltage signal (V_OUT). Thus, the output of comparator 60 (V_23) being high indicates that the output voltage exceeds (i.e., is greater in magnitude than) ⅔ (V_BATT); the output of comparator 62 (V_12) being high indicates that the output voltage exceeds ½ (V_BATT); and the output of comparator 64 (V_13) being high indicates that the output voltage exceeds ⅓ (V_BATT). One input of comparator 58 (e.g., the inverting input) is similarly connected to the output voltage signal. However, the other input of comparator 58 (e.g., the non-inverting input) is connected to the reference voltage signal (V_REF). Thus, the output of comparator 58 (V_UD) being high indicates that the reference voltage exceeds the output voltage. Conversely, the output of comparator 58 being low indicates that the output voltage exceeds the reference voltage. The output of comparator 58 (V_UD) serves as a direction comparison signal, indicating to control logic 20

(FIG. 1) in which direction, "up" or "down," control logic 20 should cause the output voltage signal to change.

In the exemplary embodiment, mode selection logic 32 of control logic 20 (FIG. 1) can include combinational logic that determines the mode to which control logic 20 is to cause switch matrix 16 to switch in order to cause the output voltage signal to change in the direction indicated by the direction comparison signal. Mode selection logic 32 receives comparison signals 30, comprising the outputs of comparators 58-64. Comparison signals 30 can be provided as inputs to the combinational logic. The combinational logic can be provided in any suitable form, such as a network of logic gates (not shown). For purposes of clarity, the combinational logic is represented herein in the form of the table 80 shown in FIG. 7. Nevertheless, persons skilled in the art are readily capable of providing the logic of table 80 as a network of logic gates or any other suitable form. Mode selection logic 32 outputs mode selection signals 36 (FIG. 1) in response to comparison signals 30 and the combinational logic.

Table 80 indicates the "next mode" to which control logic 20 is to cause switch matrix 16 to switch in response to a combination of the outputs of comparators 58-64 (V_UD, V_23, V_12 and V_13, respectively). The modes indicated in table 80 are those described above: the ⅓ mode, the ½A mode, the ½B mode, and the ⅔ mode. Table 80 also indicates whether to "hold" the current mode, i.e., to maintain the current mode as the next mode. Specifically, the outputs of all of comparators 58-64 being low indicates that the current mode is to be held in the (second phase configuration of the) ⅓ mode. In all other instances, table 80 indicates that the mode is to switch. As described below, the mode can switch from the current mode to the next mode on every other clock cycle. It should be noted that a reference herein to "switching" or "changing" modes or to providing a mode control signal is intended to encompass within its scope of meaning not only changing to a different mode but also to maintaining the same mode at the time during which mode switching can occur, i.e., switching or changing from the current mode to the "next" mode in an instance in which both the current mode and next mode are the same. Also note that in the exemplary embodiment table 80 omits the instance in which the outputs of all of comparators 58-64 are high, as this combination would indicate that control logic 20 is to cause the output voltage signal to approach the battery voltage, which may be undesirable. Nevertheless, in other embodiments such an output and associated additional mode can be provided.

Although not shown for purposes of clarity, mode selection logic 32 (FIG. 1) can include not only the logic reflected in table 80 but also encoding logic to encode some or all of the output, i.e., the next mode, and provide mode selection signals 36 in an encoded form. The encoding logic can encode the output in the form of, for example, a 3-bit word (MODE[2:0]). For example, the next mode output "⅓" can be encoded as "001"; the next mode output "½A" can be encoded as "010"; the next mode output "½B" can be encoded as "011"; and the next mode output "⅔" can be encoded as "100". As providing such encoding logic is well within the capabilities of persons skilled in the art, it is not shown or described in further detail herein.

Figure 8:
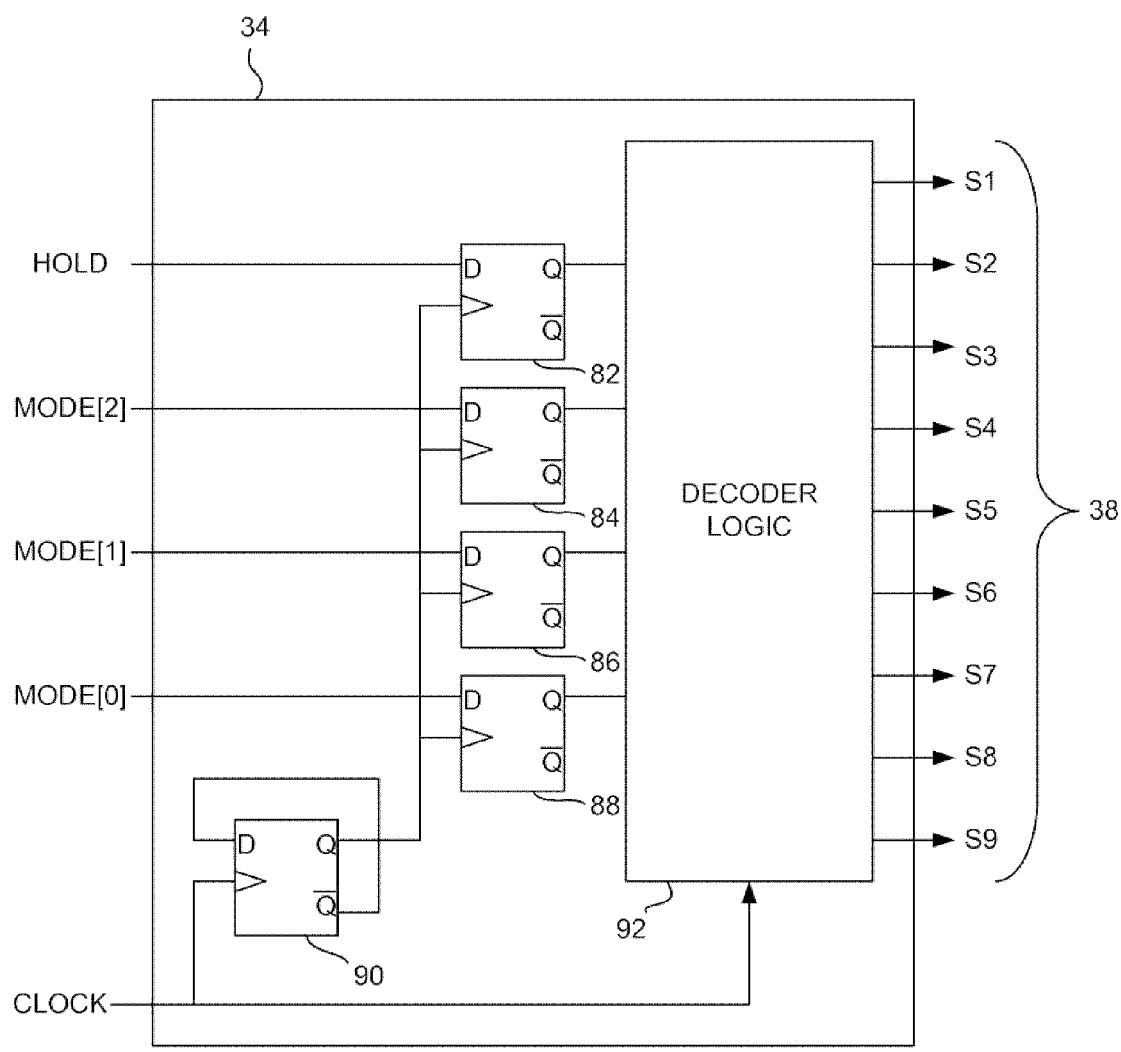
FIG. 8 is a circuit diagram illustrating the switch control logic shown in FIG. 1.

As illustrated in FIG. 8, switch control logic 34 can receive mode selection signals 36, which may be in the above-described encoded form of a 3-bit word (MODE[2:0]) and the "hold" signal. Note that the MODE[2:0] word and "hold" signal together indicate the next mode to which control logic 20 is to switch. The "hold" signal can be latched into a flip-flop 82 in control logic 34. The MODE[2] bit can be latched into a flip-flop 84 in control logic 34. The MODE[1] bit can be latched into a flip-flop 86 in control logic 34. The MODE[0] bit can be latched into a flip-flop 88 in control logic 34. Flip-flops 82-88 can be triggered, i.e., caused to latch their inputs, on every other cycle of the clock signal (CLOCK). Another flip-flop 90 can divide the clock signal by two and provide the divided clock signal to the clock inputs of flip-flops 82-88.

Switch control logic 34 also includes decoder logic 92 coupled to the outputs of flip-flops 82-88. Decoder logic 92 decodes the latched MODE[2:0] word and "hold" signal into the individual switch control signals 38 (S1-S9) that control the above-described switches 40-56 of switch matrix 16. Note that while mode selection signals 36 indicate the "next" mode, the latched MODE[2:0] word and "hold" signal indicate the "current" mode. Decoder logic 92 produces switch control signals 38 (S1-S9) in response to the current mode and the clock signal.

The operation of decoder logic 92 is reflected in the circuit diagrams of FIGS. 2-5. Note that for each mode configuration, switches 40-56 in FIGS. 2-5 assume the first phase configuration during one half of each clock cycle and assume the second phase configuration during the other half of each clock cycle. In response to the latched MODE[2:0] word indicating the ⅓ mode or "001," decoder logic 92 produces switch control signals 38 (S1-S9) to set switches 40-56 to the states shown in FIG. 2A during the first half of each clock cycle and to the states shown in FIG. 2B during the second half of each clock cycle. In response to the latched MODE[2:0] word indicating the ½A mode or "010," decoder logic 92 produces switch control signals 38 (S1-S9) to set switches 40-56 to the states shown in FIG. 3A during the first half of each clock cycle and to the states shown in FIG. 3B during the second half of each clock cycle. In response to the latched MODE[2:0] word indicating the ½B mode or "011," decoder logic 92 produces switch control signals 38 (S1-S9) to set switches 40-56 to the states shown in FIG. 4A during the first half of each clock cycle and to the states shown in FIG. 4B during the second half of each clock cycle. In response to the latched MODE[2:0] word indicating the ⅔ mode or "100," decoder logic 92 produces switch control signals 38 (S1-S9) to set switches 40-56 to the states shown in FIG. 5A during the first half of each clock cycle and to the states shown in FIG. 5B during the second half of each clock cycle. In response to the latched "hold" signal indicating the "hold" mode, decoder logic 92 produces switch control signals 38 (S1-S9) to maintain switches 40-56 in their previous mode configurations during each half of the next clock cycle.

Figure 9:
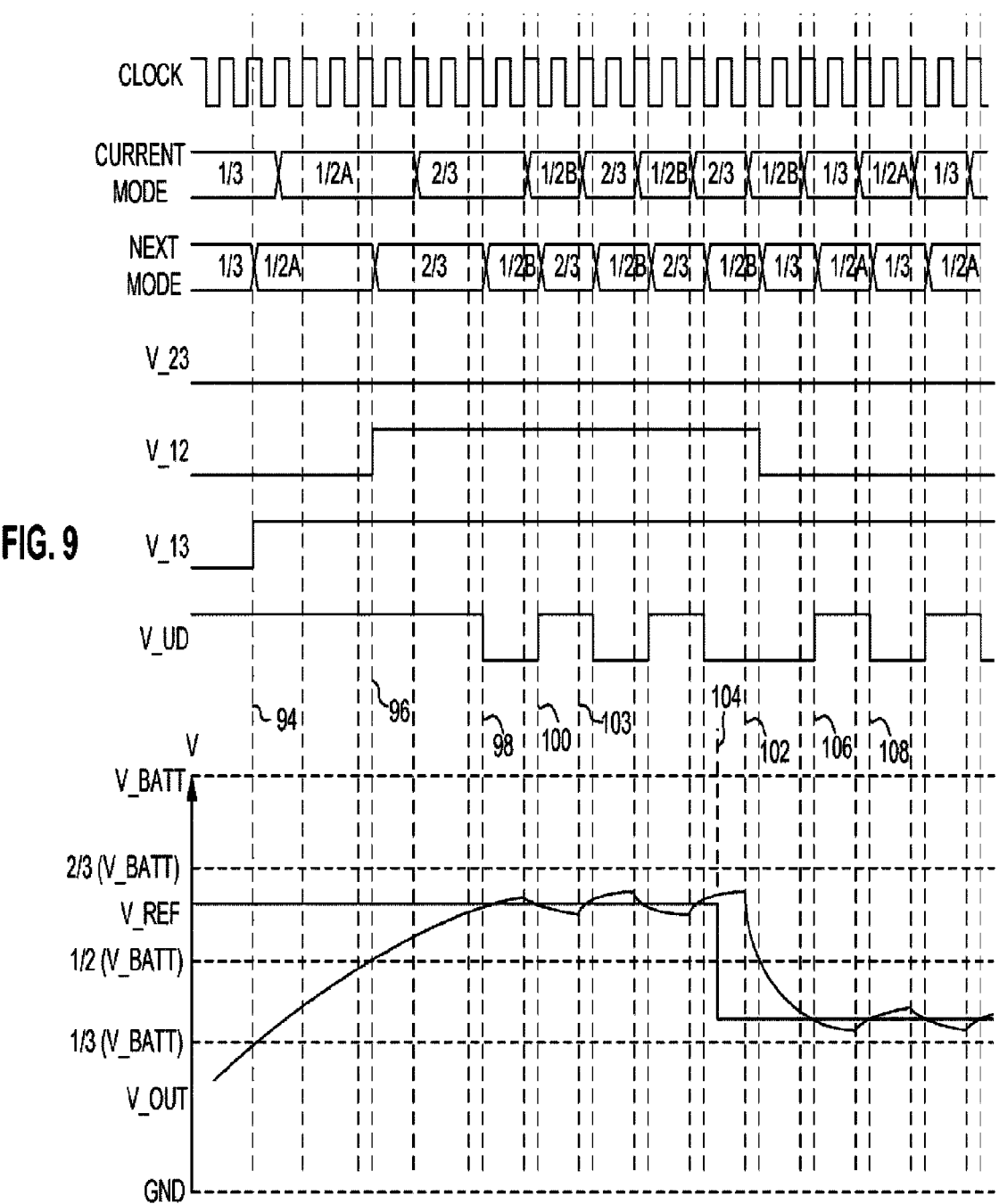
FIG. 9 is a timing diagram illustrating an exemplary instance of operation of the voltage converter of FIG. 1.

An example of the operation of voltage converter 10 in the exemplary embodiment is shown in FIG. 9. Although not shown for purposes of clarity, the output voltage (V_OUT) begins at an initial level of zero volts or ground (GND). In the illustrated example, a reference voltage (V_REF) is input. Initially, i.e., before timepoint 94, V_REF has a voltage that is between a level of one-half the battery voltage (½ (V_BATT) and two-thirds of the battery voltage (⅔ (V_BATT). Initially, the combination of the states of comparison signals 30 (V_UD, V_13, V_12 and V23) corresponds to the ⅓ mode, because V_OUT is less than one-third of the battery voltage (⅓ (V_BATT). Thus, mode selection signals 36 (FIG. 1) indicate that the next mode is the ⅓ mode. In the ⅓ mode, the operation of the capacitor circuit causes V_OUT to begin rising toward a level of ⅓ (V_BATT). It should be noted that the frequency of the clock signal (CLOCK) shown in FIG. 9 is intended only to be exemplary and can be higher in other embodiments. As the clock signal shown in FIG. 9 is shown for purposes of clarity as having a relatively low frequency, the small variations in V_OUT corresponding to the charging and discharging of the capacitor circuit as it is switched by switch matrix 16 on every one-half clock cycle are not apparent in FIG. 9.

At timepoint 94, V_OUT reaches a level of ⅓ (V_BATT). In response, the combination of the states of comparison signals 30 (V_UD, V_13, V_12 and V23) changes to correspond to the ½A mode, because V_OUT exceeds ⅓ (V_BATT) but is less than ½ (V_BATT). Note that the current mode or output of decoder logic 92 (FIG. 8) changes on every other clock cycle and latches the value of the next mode. In the ½A mode, the operation of the capacitor circuit causes V_OUT to continue rising toward a level of ½ V_BATT.

At timepoint 96 in this example, V_OUT reaches a level of ½ (V_BATT). In response, the combination of the states of comparison signals 30 (V_UD, V_13, V_12 and V23) changes to correspond to the ⅔ mode, because V_OUT exceeds ½ (V_BATT) but is less than ⅔ (V_BATT). In the ⅔ mode, the operation of the capacitor circuit causes V_OUT to continue rising toward a level of ⅔ V_BATT. However, at timepoint 98 V_OUT reaches V_REF. In response, the combination of the states of comparison signals 30 (V_UD, V_13, V_12 and V23) changes to correspond to the ½B mode. In the ½B mode, the operation of the capacitor circuit causes V_OUT to fall toward a level of ½ (V_BATT). However, at timepoint 100 V_OUT crosses V_REF again. In response, the combination of the states of comparison signals 30 (V_UD, V_13, V_12 and V23) changes to correspond to the ⅔ mode, and V_OUT again begins rising toward a level of ⅔ (V_BATT) at timepoint 103. Thus, once V_OUT reaches V_REF, V_OUT alternately crosses V_REF as it rises toward the ⅔ mode configuration and crosses V_REF as it falls toward the ½B mode configuration. Between timepoints 98 and 102, on average, V_OUT is maintained at a voltage approximately equal to V_REF. The variations or deviations in V_OUT from V_REF can be minimized by including filter circuitry at the output of voltage converter 10, such as capacitor 28 (FIG. 1).

In the example shown in FIG. 9, at timepoint 104 V_REF is changed to a new level between ⅓ (V_BATT) and ½ (V_BATT). In response, the combination of the states of comparison signals 30 (V_UD, V_13, V_12 and V23) changes to correspond to the ⅓ mode. In the ⅓ mode, the operation of the capacitor circuit causes V_OUT to fall toward a level of ⅓ (V_BATT). However, at timepoint 106 V_OUT reaches V_REF. In response, the combination of the states of comparison signals 30 (V_UD, V_13, V_12 and V23) changes to correspond to the ½A mode. In the ½A mode, the operation of the capacitor circuit causes V_OUT to rise toward a level of ½ (V_BATT). However, at timepoint 108 V_OUT crosses V_REF again. In response, the combination of the states of comparison signals 30 (V_UD, V_13, V_12 and V23) changes to correspond to the ⅓ mode, and V_OUT again begins falling toward a level of ⅓ (V_BATT). Thus, once V_OUT reaches the new V_REF level, V_OUT alternately crosses V_REF as it rises toward the ½ mode configuration and crosses V_REF as it falls toward the ⅓ mode configuration. After approximately timepoint 106, on average, V_OUT is maintained at a voltage approximately equal to the new V_REF.

Figure 10:
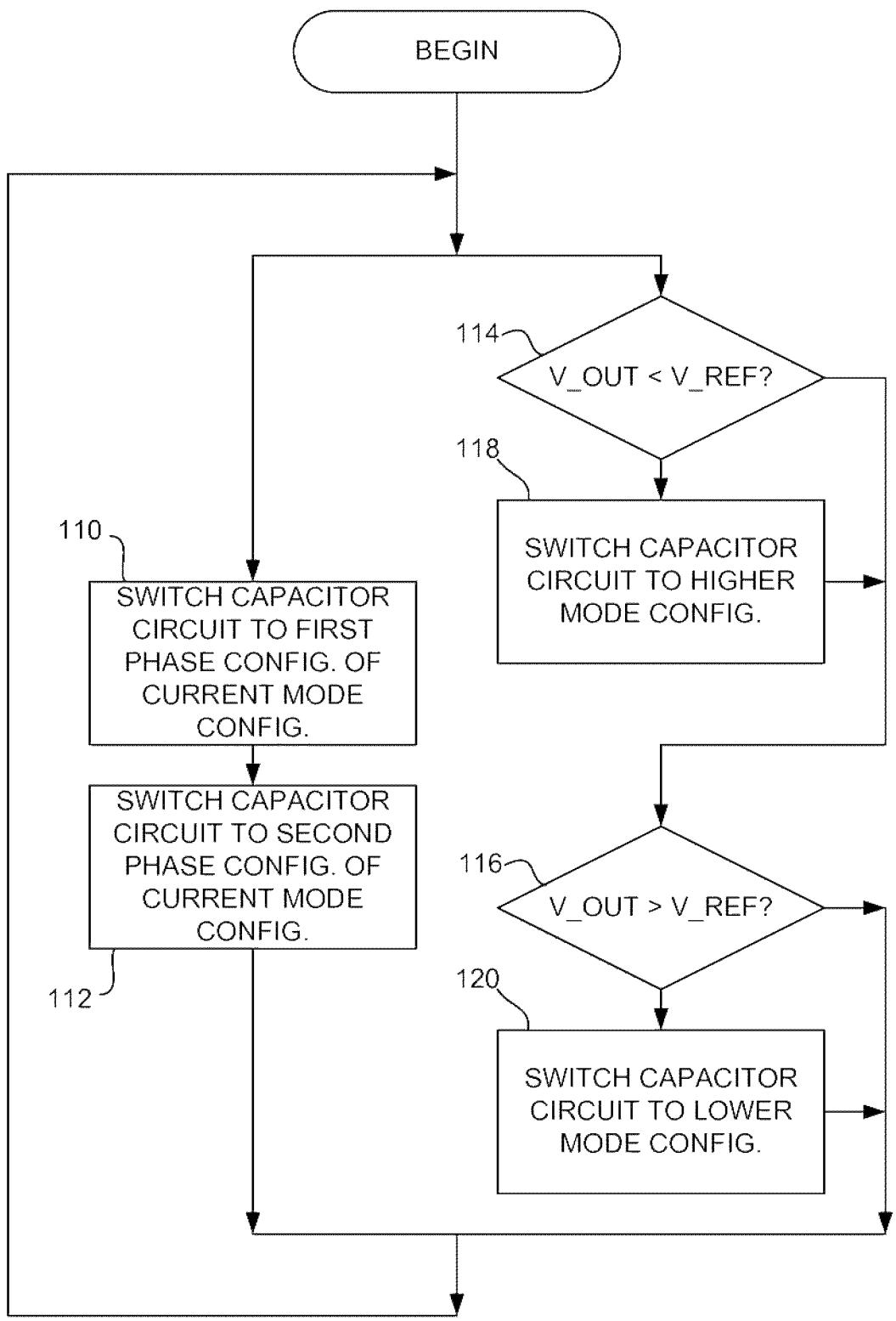
FIG. 10 is a flow diagram illustrating an exemplary method of operation of the voltage converter of FIG. 1.

As illustrated in FIG. 10, the method described above with regard to the example shown in FIG. 9 can be generalized or summarized as follows. As indicated by blocks 110 and 112, in any of the above-described mode configurations (i.e., ⅓ mode, ½A mode, ½B mode and ⅔ mode), switch matrix 16 (FIG. 1) continuously switches the capacitor circuit between the first phase configuration and the second phase configuration of that mode. This phase switching occurs in response to the clock signal, with the first phase configuration occurring during one half of each clock cycle, and the second phase configuration occurring during the other half of each clock cycle. This phase switching occurs in parallel with mode switching. As indicated by blocks 114 and 116, comparator circuit 18 (FIG. 1) compares the output voltage signal (V_OUT) with the reference signal (V_REF) and produces comparison signals 30. The comparison signals include a direction comparison signal that indicates which of the output voltage signal and reference voltage signal is greater in magnitude than the other. Control logic 20 switches the mode to a mode that corresponds to a higher output voltage if V_OUT is less than V_REF, as indicated by block 118. Control logic 20 switches the mode to a mode that corresponds to a lower output voltage if V_OUT is greater than V_REF, as indicated by block 120. In the exemplary embodiment, there are essentially three modes that have levels that are fixed relative to the battery voltage: ⅓ mode, in which V_OUT is driven toward a voltage level that is one-third of the battery voltage; ½ mode, in which V_OUT is driven toward a voltage level that is one-half of the battery voltage; and ⅔ mode, in which V_OUT is driven toward a voltage level that is two-thirds of the battery voltage. By switching between two of these modes, control logic 20 can cause V_OUT to assume an average value that is approximately equal to V_REF in an instance in which V_REF lies between voltages corresponding to the two modes. Although in the exemplary embodiment there are three modes, in other embodiments there can be more or fewer modes. Similarly, although in the exemplary embodiment there is no mode in which V_OUT is driven toward the battery voltage and no mode in which V_OUT is driven toward ground, in other embodiments such modes can be included.

While various embodiments of the invention have been described, it will be apparent to those of ordinary skill in the art that many more embodiments and implementations are possible that are within the scope of this invention. Accordingly, the invention is not to be restricted except in light of the following claims.

What is claimed is:

1. A method for converting voltage, comprising:
providing a capacitor circuit having capacitors capable of being interconnected differently by a switch matrix between a voltage node and an output node in each of at least two mode configurations, each mode configuration including a first phase configuration associated with discharging the capacitor circuit and a second phase configuration associated with charging the capacitor circuit;
producing a mode selection signal in response to a comparison of an output voltage at the output node and a reference voltage, and a comparison involving a different voltage associated with each of the at least two mode configurations; and
configuring the switch matrix to interconnect the capacitors into one of the at least two mode configurations based on the mode selection signal.

2. A method for performing voltage conversion, the method comprising:
providing a capacitor circuit having capacitors capable of being interconnected by a switch matrix in each of at least two mode configurations, each mode configuration having a voltage level at an output node that is a different fraction of a voltage potential and including a first phase configuration associated with discharging the capacitor circuit and a second phase configuration associated with charging the capacitor circuit;

generating a mode selection signal based on a first signal and a second signal, the first signal being indicative of whether an output voltage at the output node is greater in magnitude than a reference voltage, and the second signal being indicative of whether the output voltage is greater in magnitude than a first voltage level corresponding to a first of the at least two mode configurations; and configuring the switch matrix to interconnect the capacitors into one of the at least two mode configurations based on the mode selection signal.

3. The method of claim 2 wherein the configuring of the switch matrix includes interconnecting the capacitors between a ground potential and the output node in the first phase configuration of each of the at least two of mode configurations.

4. The method of claim 3 wherein the switch matrix is configured to interconnect the capacitors differently between the ground potential and the output node in different mode configurations of the at least two of mode configurations.

5. The method of claim 2 wherein the configuring of the switch matrix includes switching between the first phase configuration and the second phase configuration responsive to a clock signal.

6. The method of claim 2 wherein the at least two mode configurations include three or more mode configurations.

7. The method of claim 2 wherein the voltage potential is provided by a battery.

8. The method of claim 2 further comprising providing the first signal and the second signal with a comparator circuit.

9. The method of claim 8 further comprising providing a third signal indicative of whether the output voltage is greater in magnitude than a second voltage level corresponding to a second of the at least two mode configurations, such that the mode selection signal is generated based on the third signal.

10. A method for performing voltage conversion, the method comprising:

providing a capacitor circuit having capacitors capable of being interconnected differently by a switch matrix between a voltage potential and an output node to provide an output voltage at the output node in each of a plurality of mode configurations;

generating a mode selection signal based on a first comparison signal indicative of whether the output voltage is greater in magnitude than a reference voltage, a second comparison signal indicative of whether the output voltage is greater in magnitude than a first voltage level associated with a first of the plurality of mode configurations, and a third comparison signal indicative of whether the output voltage is greater in magnitude than a second voltage level associated with a second of the plurality of mode configurations; and configuring the switch matrix to interconnect the capacitors into one of the plurality of mode configurations based on the mode selection signal.

11. The method of claim 10 wherein each of the plurality of mode configurations includes a first phase configuration associated with discharging the capacitor circuit and a second phase configuration associated with charging the capacitor circuit.

12. The method of claim 11 wherein the configuring of the switch matrix includes interconnecting the capacitors between a ground and the output node in the first phase configuration, and interconnecting the capacitors between the voltage potential and the output node in the second phase configuration.

13. The method of claim 10 wherein the plurality of mode configurations includes three or more mode configurations.

14. The method of claim 13 wherein the generating of the mode selection signal is further based on a fourth comparison signal indicative of whether the output voltage is greater in magnitude than a third voltage level associated with a third of the plurality of mode configurations.

* * * * *